H. T. SHRIVER.
ELECTROLYTIC APPARATUS.
APPLICATION FILED JAN. 20, 1916.
1,256,067. Patented Feb. 12, 1918.
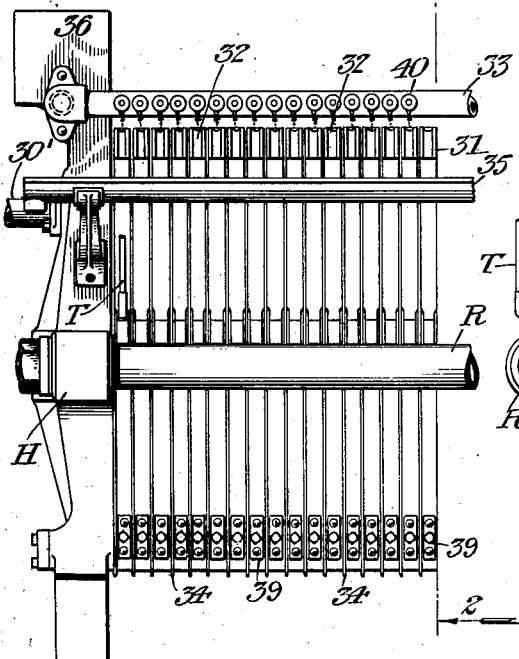
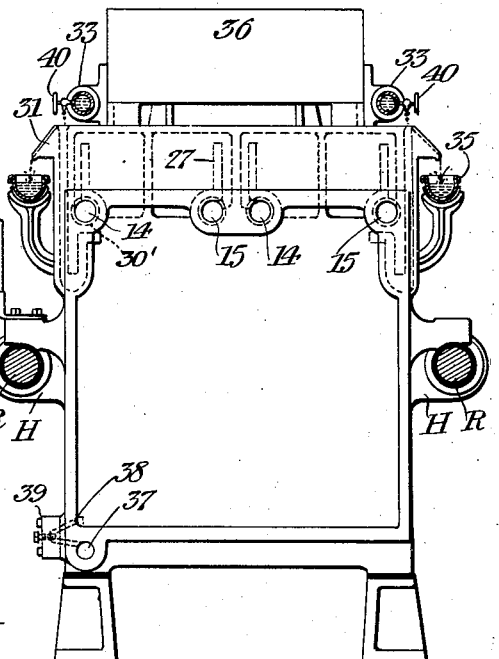
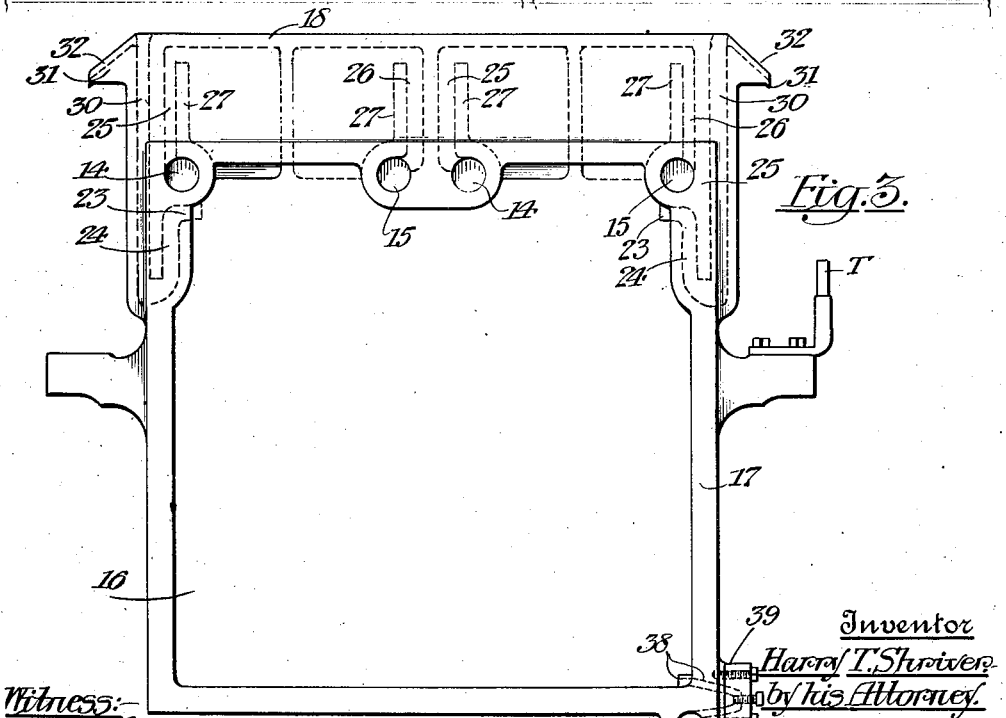

UNITED STATES PATENT OFFICE.

HARRY T. SHRIVER, OF WEST ORANGE, NEW JERSEY.

ELECTROLYTIC APPARATUS.

1,256,067.  Specification of Letters Patent.  Patented Feb. 12, 1918.

Application filed January 20, 1916. Serial No. 73,117.

*To all whom it may concern:*

Be it known that I, HARRY T. SHRIVER, a citizen of the United States, residing at Llewellyn Park, West Orange, in the county of Essex, State of New Jersey, have invented certain new and useful Improvements in Electrolytic Apparatus; and I do declare the following to be a full, true, and exact description of the said invention, such as will enable others skilled in the art to which it appertains to make use of the same.

This invention relates to electrolytic apparatus such as is particularly suited for decomposing liquids, generally water, into their constituent gases.

I have found it desirable in an electrolyzer, particularly of the filter press type, to provide a supply diluent in which the diluent will be supplied at a constant pressure to the cell, and also to provide a means by which it will be assured that the electrolyte in the cell will not, under any conditions, be forced back so as to mix with the diluent supply. Such an arrangement is particularly advantageous where there are a number of cells in series as in the filter press type, for by such an arrangement the specific gravity in each of the cells is maintained constant so that each of the cells works under exactly the same conditions as all of the others.

With these and other objects in view, my invention consists of certain novel features of construction, combination and arrangement of parts, as will be more fully described and pointed out in the appended claims.

In the drawings, Figure 1 is a side elevation of a portion of an electrolyzer of the filter press type which I have shown for the purposes of illustration, showing some of my novel features.

Fig. 2 is a section on the line 2—2 of Fig. 1 and Fig. 3 is an enlarged detail of one of the plates of the arrangement illustrated in Fig. 1.

The corresponding parts are referred to both in the drawings and in the specification by similar reference characters.

In Figs. 1 and 2, I have illustrated one end of the filter press type electrolyzer of the usual construction with my novel features added, the parts omitted being no part of my present invention. H is one of the heads of the apparatus which are drawn together by means of the rods R in the usual manner. The cells are formed of recessed plates having a raised finished edge 17 and a depression 16 on either side of the central member, as usually constructed. A number of these plates are held edge to edge with the gasket diaphragm 34 between each to insulate them, and also to keep the gases separate which are formed on the anode and cathode of each cell. The pressure rods R serve to bind the gaskets between the successive plates so that the electrolyte which fills the recesses in the plates cannot leak out. Current is passed through these successive plates in series from any suitable source of electricity, one of the terminals being shown at T. This current passing through the electrolyte, usually a solution of caustic potash or caustic soda, converts the water therein into hydrogen and oxygen respectively, which are kept separate by the diaphragm. While I have shown and described the device as suitable for the production of hydrogen and oxygen, it will be understood that any other form of electrolyte may be used and other gases produced.

In order to carry away the gases, the ducts 14—14 and 15—15 are provided in the upper portion of each of the plates, these ducts being made up of alined openings through the several plates in the diaphragms, these ducts being connected by pipes 30' to suitable holders or receivers. These ducts are connected respectively with opposite sides of the cells by ducts 25—25 and 26—26, the gases passing over barriers 27 provided to prevent the electrolyte from flowing into the ducts 14 and 15. This arrangement is described in my copending application No. 30,285 filed May 25, 1915, and more detailed description is unnecessary. In the specific form which I have illustrated in this application, the gas chamber formed at the top of each plate is closed by the wall 18.

It will be obvious that as the electrolyte is decomposed, its level will tend to fall, and since it is desirable, in order to maintain the machine at the highest efficiency, that the electrolyte shall be maintained at a level in each cell which will give the greatest efficiency of that cell, it is desirable to arrange a supply of diluent which in the instance described will be distilled water, so that this pre-determined level is maintained constant. In the form which I have chosen for purposes of illustration, this is accomplished by providing a U-shaped duct having upwardly extending arms in the walls of each of the cells, these ducts being preferably arranged so that on one side of the plate they municate with one side of the cell, and on the other side of the plate with the other side. Referring to the drawings, such a duct is illustrated as having the two arms 30 and 24, each of which is relatively long, but the arm 24 being much shorter than the arm 30. The arm 24 has a bend 23 which connects with the recess of the cell. In the form illustrated, I have provided a source of diluent supply from a tank 36 from which the diluent runs into a pipe 33 extending above the apparatus. Above each of the arms 30 I provide preferably a small pet cock 40 which is arranged to drip so that the arm 30 is kept full of the diluent. In order to insure this, I preferably adjust the pet cocks so that the amount supplied from them exceeds the amount used up in the cell when it is working, and this excess forms an overflow from the duct 30 which runs down a gutter 32 in the projection 31 provided on each cell, into a receiving pan 35 from which it may be recovered to be returned to the tank 36 in any suitable manner. By this arrangement it will be seen that the arm 24 which will be filled with the electrolyte, which is heavier than water, will have the pressure therein balanced by the weight of the water column in the arm 30. The junction of the fluids will come at the bottom of the U-shaped duct, but the pressure in 30 is sufficient to keep this junction point so that the electrolyte and water will not mix until the pressure on the electrolyte, due to its being used up, falls below that in the arm 30, whereupon some of the water in 30 will force itself around the bottom of the U and rising through the arm 24 will pass through the electrolyte in the cell. I make the arm 24 of considerable length for I have found by experience that when this arm is comparatively short the electrolyte which may be temporarily lighter than the water, due to the minute gas bubbles therein, may force itself back into the source of diluent supply and thus become mixed with it, so that the diluent supply to the cell instead of being pure water, may become part water and part electrolyte. If this condition were continued, it would result in an unequal supply of pure water to the several cells in the series so that the specific gravity of the electrolyte in each cell may not be maintained constant. By making the arm 24 long enough any possibility of this condition being brought about is prevented, since before the electrolyte impregnated with gas can work its way down to the bottom of the arm 24, the gas therein will have risen and passed out of it so that its specific gravity will be greater than that of the diluent in the arm 30.

While I have illustrated the U-duct as opening into the upper part of the cell, it will be understood that it may be arranged to communicate with the lower part of the cell, and for some purposes such an arrangement is desirable, since by permitting the diluent to enter the bottom of the cell it will become more thoroughly mixed with the electrolyte than if injected at the top. The extension of the U-duct to the bottom of the cell would merely involve a re-arrangement of the relative lengths of the arms so that the hydrostatic balance between the diluent in one arm, and of the electrolyte in the cell together with the back pressure of the gas, in the other, will be maintained constant.

At the bottom of each cell I have provided a duct 37 which communicates with the recesses in each of the cells through ducts 38 but which is normally cut off from such communication by the valve shown in each of the blocks 39. This duct 37 permits the cleaning out of the electrolyte at any time by opening all of the valves whereby the electrolyte will flow through the duct 37 and out of the machine.

While I have shown the U-duct as incorporated in the walls of the cell, it will be understood, of course, that it may be also constructed by any suitable pipe outside of the cell and communicating with the recesses.

I claim:—

1. An electrolyzer comprising a plurality of flat plates held face to face, said plates being recessed to form a cell between the faces thereof, a diaphragm between each pair of said plates and separate means for supplying diluent to each of said recesses at a constant pressure.

2. An electrolytic cell comprising a plurality of flat plates held face to face, said plates being recessed to form a cell between the faces thereof, a diaphragm between each pair of said plates, each of said plates having a U-shaped duct formed in the walls thereof, one of said arms being relatively short and connected to said recess and the other relatively long and opening to the outside of the plate, and a constantly running supply of diluent to the long arm of said duct arranged to supply diluent thereto at a faster rate than that of exhaustion of the diluent in said cell, said long arm being arranged so that such excess overflows after a predetermined level therein has been reached by the diluent.

HARRY T. SHRIVER.

Witnesses:
 CHARLES MAURER,
 CHAS. STOKER.